UNITED STATES PATENT OFFICE.

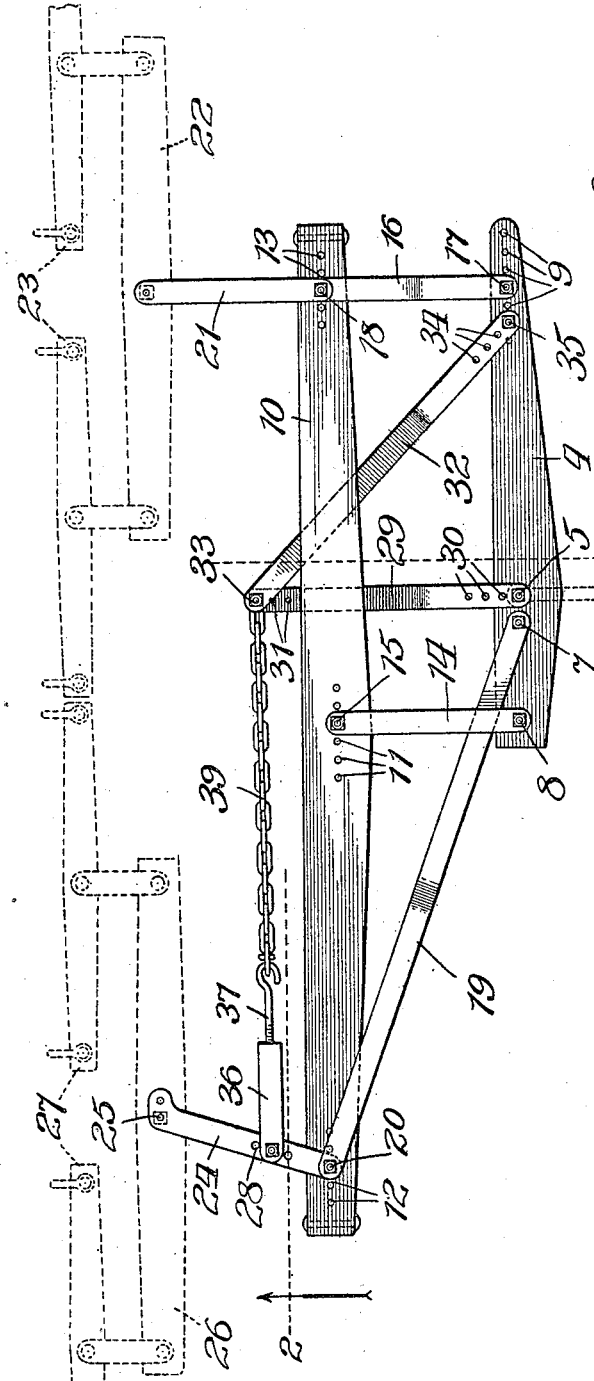

GEORGE W. RAYMOND, OF MORRIS, ILLINOIS.

DRAFT-EQUALIZER.

No. 837,727.  Specification of Letters Patent.  Patented Dec. 4, 1906.

Application filed June 7, 1906. Serial No. 320,602.

*To all whom it may concern:*

Be it known that I, GEORGE W. RAYMOND, a citizen of the United States, residing at Morris, in the county of Grundy and State of Illinois, have invented a new and useful Improvement in Draft-Equalizers, of which the following is a specification.

My invention relates to improvements in the construction of draft-equalizers for employment in connection with plows and agricultural machines generally to avoid side draft where the line of pull is to one side of the line of greatest resistance, and relates more particularly to draft-equalizers designed for use with four horses abreast when it is desired that the point of attachment with the plow or the like shall be to one side of a line midway between the outer draft-animals.

My object is to provide a simple, strong, and durable equalizer of improved construction which will be particularly efficacious in avoiding side draft, and thereby maintaining the course of travel of the plow or the like straight.

Referring to the drawings, Figure 1 is a plan view of my improved equalizer especially adapted for plows, indicating by dotted lines the points at which doubletrees with swingletrees for four horses are attached; Fig. 2, an enlarged broken section taken on line 2 in Fig. 1, and Fig. 3 an enlarged section taken on line 3 in Fig. 1.

4 is a lever or main doubletree, which may be a steel-bar of the shape shown and provided with a bolt-opening, in the position indicated, for a bolt 5 in the nature of a king-bolt, to which a clevis 6 on the end of the plow-beam (not shown) is pivotally secured. The bolt 5 forms a fulcrum for the lever 4. On the short arm of the said lever in the relative positions shown are openings for bolts 7 and 8, and in the outer end portion of the long arm of the lever is a series of bolt-openings 9.

10 is a doubletree provided along its central portion with a series of bolt-openings 11 and toward its outer ends, respectively, with a series of bolt-openings 12 and 13. A center link 14, consisting of upper and lower metal straps, is pivotally connected at one end to the bolt 8 and at its opposite end to a bolt 15 in one of the openings 11. An end link 16 is pivotally connected at one end to a bolt 17 in one of the openings 9 and at its opposite end to a bolt 18 in one of the openings 13. The links 14 16 tend to hold the bars or eveners 4 10 in parallel relation to each other.

19 is a link pivotally-connected at one end to the bolt 7 and at its opposite end to a bolt 20 in one of the openings 12. The link 19 may be a flexible metal bar or a chain or the like.

Pivotally fastened to the bolt 18 is a draft-animal-attaching link 21, having a bolt-opening in its outer end portion for attachment to a doubletree 22, carrying the swingletrees 23. A draft-animal-attaching link 24 is pivotally connected at one end to the bolt 20 and at its opposite end has a pair of parallel bolt-openings through either of which a bolt 25 may be passed for the attachment of a doubletree 26, carrying swingletrees 27. Between the ends of the link 24 in the position shown is a series of bolt-openings 28. A bar 29, consisting of upper and lower members, as indicated in Fig. 3, has a series of bolt-openings 30 in one end portion, at one of which it is pivotally secured to the bolt 5, and in its opposite end it has a series of bolt-openings 31.

32 is a bar or connecting medium provided at one end with an opening to receive a bolt 33, at which it is attached to the bar 29 at one of the openings 31. In the opposite end portion of the bar 32 is a series of bolt-openings 34 for a bolt 35, at which the bar is attached to one of the openings 9 in the lever 4.

36 is a clip pivotally connected to a bolt in one of the openings 28 of the link 24. In the end of the clip is an opening to receive the threaded shank of a hook 37, adjustably retained by a nut and jam-nut 38.

39 is a chain or other suitable, preferably flexible, medium or link connection attached at one end to the bolt 33 and at its opposite end to the hook 37.

All the bolt-openings described are somewhat larger in diameter than the bolts they receive to admit of slight independent play between the parts at all the joints.

It will be understood that the object of the equalizer is to cause pairs of draft-animals hitched to the swingletrees 23 and 27, respectively, to exert substantially equal pulling force upon the plow connected at 6 in a manner to avoid side draft. The doubletree 22 is materially closer to the longitudinal plane of the clevis 6 than the doubletree 26. The pull upon the doubletree 22 through the link 21 and link 16 is in a direction which would tend to swing the lever or evener 4 upon the fulcrum 5 and the doubletree or evener 10 upon the fulcrum 15. Forward pull upon the doubletree 26 would tend to cause it to swing the evener 10 upon its fulcrum 15 and the doubletree 4 upon its fulcrum 5. The point of connection 20 being materially further laterally from the point 5 than the point 18, the leverage from that side would be materially greater. This excess of leverage is overcome, however, by causing the link 24 to extend obliquely, as indicated, and in its tendency to straighten under a pull upon the doubletree 26 to draw upon the chain 39 against the apex 33 of the triangle formed by the parts 4 29 32. This compensates for the excess in length of leverage on that side over the other side, and thus produces the same effect as would be caused by connecting the clevis 6 to the doubletree 10 midway between the bolts 18 and 20.

By providing the series of openings 9 in the evener 4, the series 11, 12, and 13 in the evener 10, the series 30 and 31 in the bar 29, and the series 28 25 in the link 24 various adjustments may be effected—as, for example, when it is desired to equalize the draft when there is a material difference in the weight and pulling power of the two teams. The oblique angle of the link 24 may also be changed by shortening or lengthening the hook 37. To all intents and purposes both the bars 19 and 32 may be chains or other flexible connections, because the force exerted against them is at all times in the form of longitudinal strain.

My improved draft-equalizer is formed of comparatively few readily-adjustable parts so disposed as to contribute strength and durability to the device.

What I claim as new, and desire to secure by Letters Patent, is—

1. In a draft-equalizer, the combination of a lever with means for connecting it at its fulcrum with a plow or other implement, a main doubletree, a center link connecting the doubletree toward its center to the said lever near and at one side of the said fulcrum thereof, an end link connecting said doubletree and lever, near their ends at the opposite side of said fulcrum, a bar extending forward from said lever adjacent to the fulcrum thereof and held against independent movement thereon in the direction away from said end link, a draft-animal-attaching link extending forward from the said doubletree adjacent to said end link, a second draft-animal-attaching link extending obliquely forward from the opposite end portion of said doubletree and inclined toward the center thereof, and a pivotal link connection between said second link and the end portion of said bar, for the purpose set forth.

2. In a draft-equalizer, the combination of a lever with means for connecting it at its fulcrum with a plow or other implement, a main doubletree, a center link connecting the doubletree toward its center to the said lever near and at one side of the said fulcrum thereof, an end link connecting said doubletree and lever near their ends, at the opposite side of said fulcrum, a bar extending forward from said lever adjacent to the fulcrum thereof, a link connection extending between the forward end portion of said bar and the end portion of said lever near said end link and forming with said bar and lever a triangle, a draft-animal-attaching link extending from said doubletree adjacent to said end link, a second draft-animal-attaching link extending obliquely forward from the opposite end portion of said doubletree and inclined toward the center thereof, and a pivotal link connection between the said second link and the apex portion of said triangle.

3. In a draft-equalizer, the combination of a lever with means for connecting it at its fulcrum with a plow or other implement, a main doubletree, a center link connecting the doubletree toward its center to the said lever near and at one side of the said fulcrum thereof, an end link connecting said doubletree and lever near their ends, at the opposite side of said fulcrum, a bar extending forward from said lever adjacent to the fulcrum thereof and held against independent movement thereon in the direction away from said end link, a draft-animal-attaching link extending from said doubletree adjacent to said end link, a second draft-animal-attaching link extending obliquely forward from the opposite end portion of said doubletree and inclined toward the center thereof, a pivotal link connection between said second link and the end portion of said bar, and a pivotal link connection between the end portion of said doubletree adjacent to said second link and the lever, between the fulcrum thereof and the said center link, for the purpose set forth.

4. In a draft-equalizer, the combination of a lever with means for connecting it at its fulcrum with a plow or other implement, a main doubletree, a center link connecting the doubletree toward its center to the said lever near and at one side of the said fulcrum thereof, an end link connecting said doubletree and lever near their ends at the opposite side of said fulcrum, a bar extending forward from said lever adjacent to the fulcrum thereof and held against independent movement thereon in the direction away from said end link, a draft-animal-attaching link extending forward from the said doubletree adjacent to said end link, a second draft-animal-attaching link extending obliquely forward from the opposite end portion of said doubletree and inclined toward the center thereof, and a pivotal link connection between said second link and the end portion of said bar, the said center link, end link and draft-animal-attaching links being adjustable longitudinally of the doubletree and the said end link being also adjustable longitudinally of the lever, for the purpose set forth.

5. In a draft-equalizer, the combination of a lever with means for connecting it at its fulcrum with a plow or other implement, a main doubletree, a center link connecting the doubletree toward its center to the said lever near and at one side of the said fulcrum thereof, an end link connecting said doubletree and lever near their ends at the opposite side of said fulcrum, a bar extending forward from said lever adjacent to the fulcrum thereof and held against independent movement thereon in the direction away from said end link, a draft-animal-attaching link extending forward from the said doubletree adjacent to said end link, a second draft-animal-attaching link extending obliquely forward from the opposite end portion of said doubletree and inclined toward the center thereof, and a pivotal link connection between said second link and the end portion of said bar, the said center link, end link and draft-animal-attaching links being adjustable longitudinally of the doubletree and the said end link being also adjustable longitudinally of the lever, and the said forward extending bar being longitudinally adjustable upon the said fulcrum of the lever, for the purpose set forth.

GEORGE W. RAYMOND.

Witnesses:
  C. G. BRIGGLE,
  A. H. HILLIKER.